(12) United States Patent
Knight

(10) Patent No.: US 7,483,570 B1
(45) Date of Patent: Jan. 27, 2009

(54) SOFTWARE AND METHOD FOR CREATING A DYNAMIC HANDWRITING FONT

(76) Inventor: Andrew F. Knight, 2521 Glengyle Dr., Vienna, VA (US) 22181

(*) Notice: Subject to any disclaimer, the term of this patent is extended or adjusted under 35 U.S.C. 154(b) by 845 days.

(21) Appl. No.: 10/775,238

(22) Filed: Feb. 11, 2004

(51) Int. Cl.
*G06K 9/18* (2006.01)

(52) U.S. Cl. .............. 382/186; 382/203; 345/471; 345/467

(58) Field of Classification Search .......... 382/189, 382/187, 186, 203, 197, 313, 209, 311, 309, 382/161, 229, 301; 345/629, 467, 471, 170, 345/468, 173; 400/697, 615.2, 144.2, 120.16
See application file for complete search history.

(56) References Cited

U.S. PATENT DOCUMENTS

| | | | | |
|---|---|---|---|---|
| 4,785,391 A * | 11/1988 | Apley et al. | .............. | 345/469 |
| 5,099,435 A * | 3/1992 | Collins et al. | .............. | 345/469 |
| 5,108,206 A * | 4/1992 | Yoshida | .............. | 400/61 |
| 5,295,238 A | 3/1994 | Dickson | | |
| 5,315,668 A * | 5/1994 | O'Hair | .............. | 382/159 |
| 5,327,342 A | 7/1994 | Roy | | |
| 5,412,771 A | 5/1995 | Fenwick | | |
| 5,581,633 A * | 12/1996 | Hotta et al. | .............. | 382/171 |
| 6,298,154 B1 * | 10/2001 | Cok | .............. | 382/186 |
| 6,340,967 B1 * | 1/2002 | Maxted | .............. | 345/179 |
| 6,363,162 B1 * | 3/2002 | Moed et al. | .............. | 382/112 |
| 6,415,062 B1 * | 7/2002 | Moed et al. | .............. | 382/260 |
| 6,507,670 B1 * | 1/2003 | Moed | .............. | 382/172 |
| 6,563,949 B1 * | 5/2003 | Takebe | .............. | 382/190 |
| 6,707,942 B1 * | 3/2004 | Cortopassi et al. | .............. | 382/186 |
| 7,197,174 B1 * | 3/2007 | Koizumi | .............. | 382/139 |
| 2001/0026262 A1 | 10/2001 | Van Gestel et al. | | |
| 2002/0057281 A1 * | 5/2002 | Moroo et al. | .............. | 345/668 |

* cited by examiner

*Primary Examiner*—Sheela C Chawan

(57) ABSTRACT

A machine-readable storage medium storing executable code is configured to cause a machine to randomly alter a shape of a character. A method for creating a dynamic handwriting font includes: providing a first shaped character; providing a predetermined frequency distribution; and randomly altering a shape of the first shaped character according at least partially to the frequency distribution.

19 Claims, 5 Drawing Sheets

SOFTWARE AND METHOD FOR CREATING A DYNAMIC HANDWRITING FONT

BACKGROUND

Few people voluntarily read junkmail. In fact, most junkmail is never even opened because the recipient's name and address is usually printed in block text by a poor quality dot matrix printer (in spite of the ready availability of laser and ink jet printers), and the recipient readily identifies the mail as an unsolicited, unwanted advertisement. Further, even if the recipient opens the mail, the letter or information inside is usually a mass printed material and, if personalized, is clearly printed by one of many well known "mail merger" programs, thus providing a very impersonal quality. Attempts to solve this problem have included creating computer-generated fonts that emulate handwriting. Such fonts may include a simple script, in which the individual characters are formed in the same manner as conventional fonts, with the only exception that the characters have a sort of cursive handwriting shape. Other methods improve on this simple method by automatically connecting the cursive- or script-style characters in each word, to emulate the connection of letters in a cursive handwriting word. Further, other methods (see, e.g., U.S. Pat. No. 5,412,771) have resulted in context-driven selection of characters, based on the recognition that the shape of a particular character may differ depending on whether the particular character appears alone, at the beginning of a word, in the middle of word, or at the end of a word. Finally, U.S. Pat. No. 5,108,206 recognizes that "a document having such a computer-generated font is likely to lack human touches and to be irksome"—perhaps even as irksome as the word "irksome" itself—and discloses obtaining data as to size and inclination of a character and character pitch and line pitch on the basis of random numbers.

SUMMARY OF THE INVENTION

One problem with the existing methods is that the number of available "versions" of any particular character are limited to one or a few (such as in the case of three or four context-selected versions of a character), so that most or all of the corresponding characters printed on a document will appear identical or substantially the same. Some handwriting fonts attempt to closely emulate handwriting by containing a few "sloppy" characters, such as a sloppy "f" character, on the presumption that sloppiness will fool a reader into believing that the printed font is a genuine handwriting. But once a reader realizes that every sloppily written "f" in the printed document is identical (or perhaps there are only one or two other variations), the reader will quickly realize that no person is able to write so perfectly consistently sloppy, and that the document is a machine-printed document (and not a handwritten document).

A computer- or machine-generated font that closely emulates actual human handwriting will have many uses, as understood by one of ordinary skill in the art, including the apparent personalization of advertisements and mass correspondence.

The present invention aims to solve at least one or more of these and other problems. The present invention recognizes that actual human handwriting is based loosely on a bare mental understanding of how a particular shaped character should be formed, modified by the superimposition of random forces in actually forming the shaped character. For example, even in the absence of any conscious intention to form two instances of the same shaped character differently, a person is simply incapable of forming these two instances identically, due to apparently random forces (such as shaking or twitching of one's hand and other factors). Therefore, even though two subsequent handwritten instances of the letter "e" in the word "feel" are the same shaped character, their shapes will differ from each other randomly. Thus, by randomly altering the shapes of shaped characters, a more authentic appearing handwriting font may be implemented and printed by a machine.

According to a preferred embodiment of the present invention, a machine-readable storage medium storing executable code is configured to cause a machine to randomly alter a shape of a character.

In a preferred aspect, the medium is configured to cause the machine to perform the following steps: providing a first shaped character; providing a predetermined frequency distribution; and randomly altering a shape of the first shaped character according at least partially to the frequency distribution.

In another preferred aspect, the medium is configured to cause the machine to perform the following steps: providing a handwriting font comprising a plurality of shaped characters, wherein the plurality of shaped characters comprises a first shaped character comprising a plurality of elements, wherein the plurality of elements comprises a first element comprising a plurality of dimensionable features, wherein the plurality of dimensionable features comprises a first dimensionable feature comprising one of: a length, a height, a width, a line width, an arc length, a radius of curvature, and an angular orientation; providing a first frequency distribution of dimensions for the first dimensionable feature; randomly selecting a number; choosing a dimension for the first dimensionable feature based at least on the first frequency distribution and the randomly selected number; and creating an image of the first shaped character having the first element having the first dimensionable feature having the dimension.

In another preferred aspect, the medium is configured to cause the machine to perform the following steps: measuring a dimension of a first dimensionable feature of each of a plurality of handwritten instances of a first shaped character, so as to create a plurality of dimensions corresponding to the first dimensionable feature of the plurality of handwritten instances of the first shaped character; creating a first frequency distribution for the first dimensionable feature of the first shaped character based at least in part on the plurality of dimensions; and randomly altering a shape of the first shaped character according at least partially to the first frequency distribution.

According to another preferred embodiment of the present invention, a method for creating a dynamic handwriting font comprises: providing a first shaped character; providing a predetermined frequency distribution; and randomly altering a shape of the first shaped character according at least partially to the frequency distribution. The method may further comprise randomly selecting a number, wherein the randomly altering comprises randomly altering the shape of the first shaped character according at least partially to both of the randomly selected number and the frequency distribution.

In a preferred aspect, the method may further comprise providing a handwriting font comprising a plurality of shaped characters, wherein the plurality of shaped characters comprises the first shaped character. Providing a handwriting font may comprise: measuring a handwriting written by a person; parsing the handwriting into a plurality of handwritten characters; and creating the handwriting font at least in part from the plurality of handwritten characters. The method may further comprise providing at least one predetermined frequency distribution for each of the shaped characters.

In another preferred aspect, the first shaped character comprises at least two elements, a first of the two elements having a first dimensionable feature and a second of the two elements having a second dimensionable feature, and wherein the step of randomly altering comprises randomly altering the first dimensionable feature relative to the second dimensionable feature. The first and second dimensionable features each may comprise one of: a length, a height, a width, a line width, an arc length, a radius of curvature, and an angular orientation. The method may further comprise smoothing the first shaped character, whereby at least the first element is altered so that the first element is substantially continuous with the second element.

In another preferred aspect, the method may further comprise providing at least one predetermined frequency distribution for each of the first and second dimensionable features, wherein the step of randomly altering comprises randomly altering the first dimensionable feature according at least partially to its predetermined frequency distribution and altering the second dimensionable feature according at least partially to its predetermined frequency distribution. Each of the predetermined frequency distributions of the first and second dimensionable features may have a minimum frequency substantially at a maximum alteration. Each of the predetermined frequency distributions of the first and second dimensionable features may have a maximum frequency substantially at a minimum alteration. Each of the predetermined frequency distributions of the first and second dimensionable features may be substantially bell-shaped. A predetermined frequency distribution of the first dimensionable feature may be shaped substantially differently than a predetermined frequency distribution of the second dimensionable feature.

According to another preferred embodiment of the present invention, a method for creating a dynamic handwriting font may comprise: providing a handwriting font comprising a plurality of shaped characters, wherein the plurality of shaped characters comprises a first shaped character comprising a plurality of elements, wherein the plurality of elements comprises a first element comprising a plurality of dimensionable features, wherein the plurality of dimensionable features comprises a first dimensionable feature comprising one of: a length, a height, a width, a line width, an arc length, a radius of curvature, and an angular orientation; providing a first frequency distribution of dimensions for the first dimensionable feature; randomly selecting a number; choosing a dimension for the first dimensionable feature based at least on the first frequency distribution and the randomly selected number; and creating an image of the first shaped character having the first element having the first dimensionable feature having the dimension.

In a preferred aspect, each of the plurality of shaped characters comprises a plurality of elements, wherein each of the plurality of elements comprises a plurality of dimensionable features, wherein each of the plurality of dimensionable features comprises one of: a length, a height, a width, a line width, an arc length, a radius of curvature, and an angular orientation, and wherein the method further comprises: providing a frequency distribution of dimensions for each of the plurality of dimensionable features of the plurality of elements of the plurality of shaped characters; receiving an instruction to create an image of a first shaped character of the plurality of shaped characters; randomly selecting a first number; choosing a first dimension for a first dimensionable feature of a first element of the first shaped character based at least on the randomly selected first number and a first frequency distribution provided for the first dimensionable feature; and creating an image of the first shaped character having the first element having the first dimensionable feature having the first dimension.

In another preferred aspect, the method may further comprise: randomly selecting a number for each dimensionable feature for each element of the first shaped character; choosing a dimension for each the dimensionable feature of each the element of the first shaped character based at least on the randomly selected number for the each the dimensionable feature and the frequency distribution provided for the each the dimensionable feature; and creating an image of the first shaped character having each the dimensionable feature having the dimension for the each the dimensionable feature.

In another preferred aspect, the method may further comprise: providing a second frequency distribution of dimensions, different from the first frequency distribution, for the first dimensionable feature; and choosing between the first and second frequency distributions based at least in part on a context of the first shaped character. Creating the image may comprise smoothing the first shaped character, whereby at least one of the plurality of elements is altered so that the at least one of the plurality of elements is substantially continuous with an adjacent element. The method may comprise printing the image.

In another preferred aspect, providing a handwriting font may comprise: measuring a handwriting written by a person; parsing the handwriting into a plurality of handwritten characters; and creating the handwriting font at least in part from the plurality of handwritten characters.

According to another preferred embodiment of the present invention, a method for creating a dynamic handwriting font may comprise: measuring a dimension of a first dimensionable feature of each of a plurality of handwritten instances of a first shaped character, so as to create a plurality of dimensions corresponding to the first dimensionable feature of the plurality of handwritten instances of the first shaped character; and creating a first frequency distribution for the first dimensionable feature of the first shaped character based at least in part on the plurality of dimensions. The method may further comprise randomly altering a shape of the first shaped character according at least partially to the first frequency distribution. The method may further comprise selecting the first shaped character based at least in part on an input by a user.

In a preferred aspect, the measuring may comprise: reading an input of a handwriting written by a person; parsing the handwriting into a plurality of shaped characters comprising the first shaped character; for each shaped character, grouping handwritten instances of the each shaped character; and measuring the a dimension of the first dimensionable feature of each of the grouped handwritten instances of the first shaped character.

In another preferred aspect, the measuring may comprise: reading an input of a handwriting written by a person; parsing the handwriting into a plurality of shaped characters comprising the first shaped character; for each shaped character, grouping handwritten instances of the each shaped character; parsing the first shaped character into a plurality of elements comprising a first element, the first element having the first dimensionable feature; and measuring the a dimension of the first dimensionable feature of each of the grouped handwritten instances of the first shaped character.

In another preferred aspect, the plurality of elements comprises a second element having a second dimensionable feature, and wherein the method further comprises: measuring a dimension of the second dimensionable feature of each of the grouped handwritten instances of the first shaped character; creating a second frequency distribution for the second dimensionable feature of the first shaped character based at least in part on the plurality of dimensions; selecting the first shaped character based at least in part on an input by a user; and randomly altering the first dimensionable feature of the first shaped character based at least in part on the first frequency distribution, and randomly altering the second dimensionable feature of the first shaped character based at least in part on the second frequency distribution, wherein the first dimensionable feature is altered relative to the second dimensionable feature. The method may further comprise creating an image of the first shaped character having each of the first and second dimensionable features altered in the altering step.

DETAILED DESCRIPTION OF PREFERRED EMBODIMENTS

The disclosures of U.S. Pat. Nos. 5,108,206, 5,295,238, 5,327,342, 5,412,771, 6,298,154, and U.S. Patent Application No. 2001-0026262 are hereby incorporated by reference to the degree necessary to enable one of ordinary skill in the art to make and use the present invention.

Figure 1:
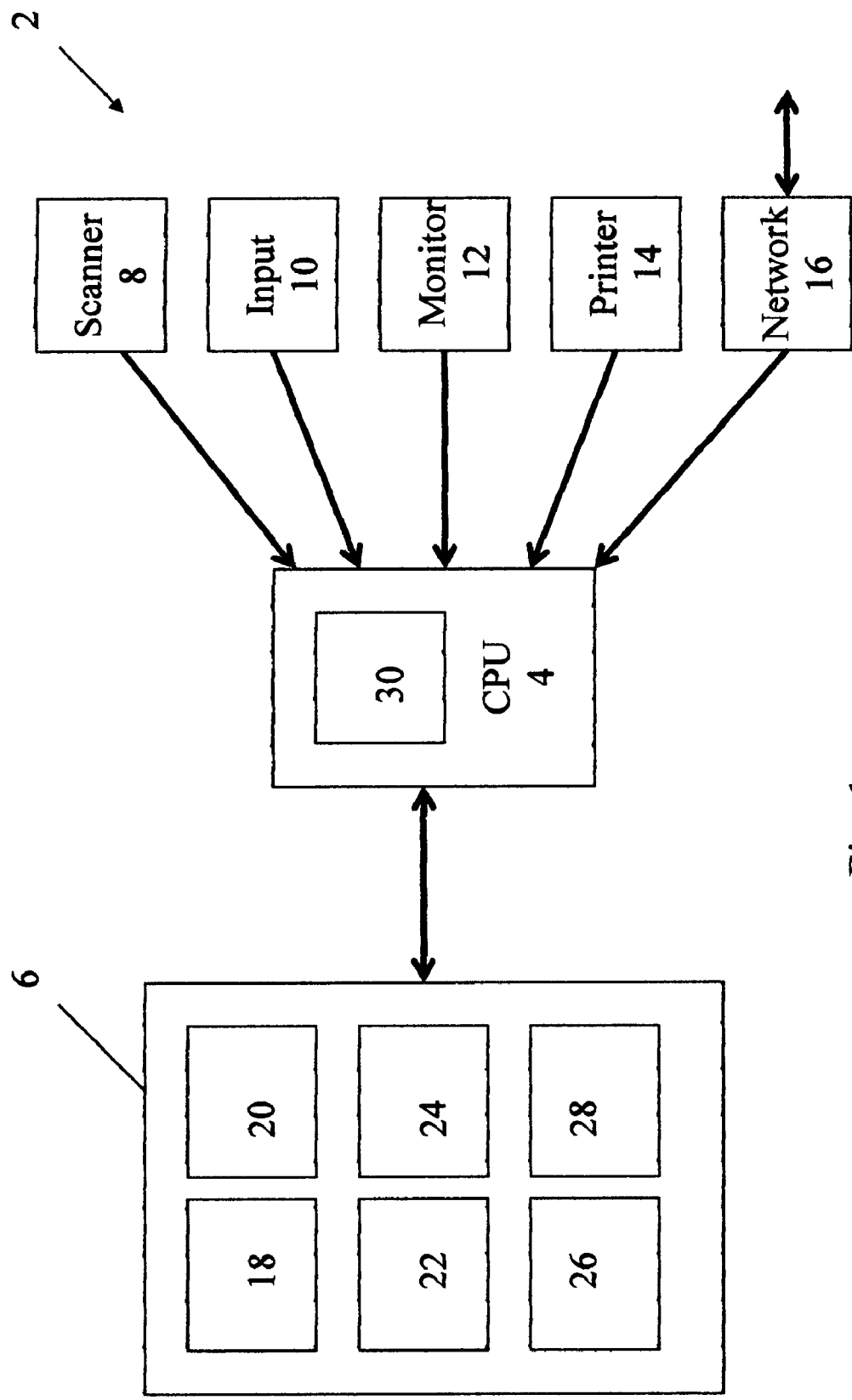
FIG. 1 shows a block diagram of an embodiment of the present invention.

Referring now to FIG. 1, a system 2 according to an embodiment of the present invention comprises a central processing unit (CPU) 4, a storage medium 6, a scanner or camera 8, a user input device 10, a monitor 12, a printer 14, and a network 16.

The CPU 4 is any conceivable information/data processing unit. For example, an intricate collection of dogs, each trained to act in a particular manner given a particular stimulus, could be arranged to perform complicated calculations. In a preferred embodiment, the CPU 4 is a microprocessor and does not comprise any dogs. The storage medium 6 is also any conceivable data/information storage medium, including but not limited to a magnetic storage device (such as a magnetic hard drive or floppy disk) or an optical storage device, such as a CD or DVD, preferably configured to store digital information. The scanner or camera 8 is a device that converts light information into preferably digital (although possibly analog) electronic information storable in the storage medium 6. The user input device 10 may include any device for allowing a user to provide instructions and/or data to CPU 4, including but not limited to a keyboard, mouse, touchpad, stylus, etc. Monitor 12 is any output device capable of providing preferably visual (and/or perhaps audio) information to the user, including but not limited to a LCD display, an electron tube display, a head-mounted display, a projector, etc. Printer 14 is any device capable of printing information on a physical medium such as paper, including but not limited to a dot-matrix printer, laser printer, ink jet printer, a pen plotter, etc.

Network 16 represents a connection between CPU 4 and one or more other computers, and may include a connection to the world wide web.

Storage medium 6 contains at least one handwriting font 18 according to an embodiment of the present invention, as well as a corresponding set 20 of frequency distributions, which will be discussed further later. Preferably, storage medium 6 contains one or more additional handwriting fonts 22 and corresponding sets 24 of frequency distributions, so that a user has an option of more than one available handwriting font. Of course, fonts 18, 22 and distributions 20, 24, while representable in a visual format (such as in the form of written or printed characters), exist in storage medium 6 as stored digital information.

Storage medium 6 may also contain one or more document files 26, 28 created or loaded into the storage medium 6 by the user. Further, the storage medium 6 preferably contains the executable software or code (not shown) for executing the method(s) according to the present invention.

CPU 4 contains a random number generator 30. Of course, the random number generator 30 could be a separate unit located internally or externally to the CPU 4, but, as understood by one of ordinary skill in the art, random number generator 30 is probably best embodied by the execution in the CPU 4 of a random number generating algorithm stored in the storage medium 6.

Figure 2A:
FIG. 2*a* shows a handwritten version of the word "feel.
Figure 2B:
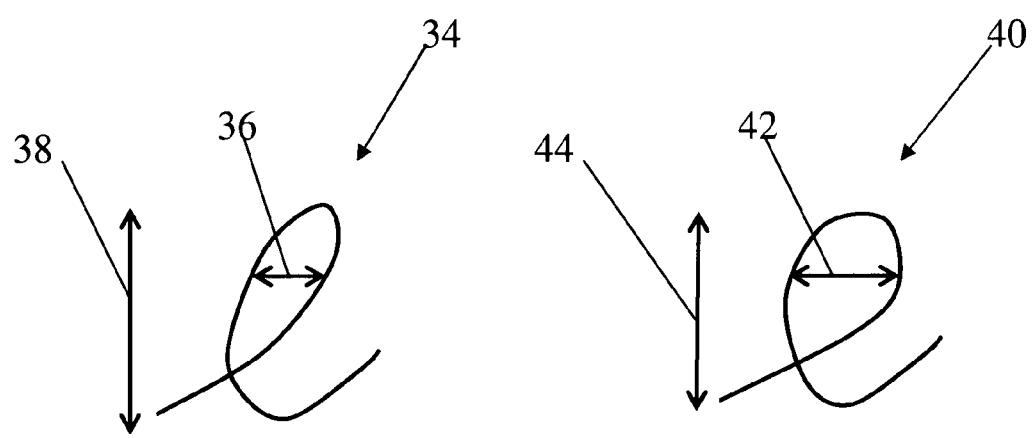
"
FIG. 2*b* shows an exploded view of two letters "e.

Referring now to FIG. 2*a*, a handwritten instance 32 of the word "feel" is shown. Notice that although the two middle letters are both handwritten instances of the letter "e," they are shaped differently. Referring now to FIG. 2*b*, first handwritten instance 34 of the letter "e" has at least two dimensionable features, namely width 36 and height 38. Width 36 is just an example for explanation. "Width" could refer to the width of the entire shaped character or, as in the case shown in FIG. 2*b*, it could refer to the width of a portion of the shaped character. A second handwritten instance 40 of the letter "e" has two dimensionable features (width 42 and height 44) corresponding to the dimensionable features 36, 38 of the first handwritten instance 34. Notice in FIG. 2*b* that, while heights 38 and 44 of the first and second handwritten instances 34, 40 are very close or identical, widths 36 and 42 differ greatly.

In an embodiment of the present invention, an authentic looking handwriting font may be created by artificially and randomly varying one or more dimensionable features in each shaped character. For example, assume that shaped character "e" identified by reference number 34 is a shaped character in a handwriting font 18 stored in storage medium 6. A user, in typing in a document 26 in first font 18 (as chosen by the user), presses the "e" button on keyboard 10. The CPU 4 then calls on the first font 18 stored in the storage medium 6 and extracts the shaped character corresponding to the letter "e," whose shape is shown as 34 in FIG. 2*b*. Next, the shaped character may be parsed into one or more elements (which will be discussed later), but this step will be skipped for explaining the present embodiment. This parsing may be done by an analysis by the CPU 4, or the location of each parsing point may be stored in first font 18 in storage medium 6 as an attribute of the shaped character. Next, the CPU 4 identifies one or more dimensionable features of each element or—as in the presently described embodiment—the shaped character as a whole. Again, the CPU 4 may identify the dimensionable features and/or the identification of the dimensionable features may be stored as attributes of the shaped character. For example, the digital data representing the letter "e" in first font 18 may also include an indication that width 36 is a dimensionable feature.

Next, the CPU 4 calls on the first frequency distribution set 20 and extracts a frequency distribution for at least one (and preferably all) of the dimensionable features. For example, for shaped character 34 in FIG. 2a, which has dimensionable features width 36 and height 38, first frequency distribution set 20 may include a single frequency distribution, such as the bell-shaped distribution 50 shown in FIG. 3a, or may include a unique or individual frequency distribution for each shaped character (e.g., one for the letter "a," one for the letter "A," one for the letter "b," one for the letter "B," and so forth), or may include a unique or individual frequency distribution for each dimensionable feature of each shaped character (e.g., one for width 36 of shaped character "e," one for height 38 of shaped character "e," one for width of shaped character "f," and so forth). Assume for explanation of the present embodiment that frequency distribution 52 (as in FIG. 3b) corresponds to (i.e., is provided for) width 36 of shaped character 34 and frequency distribution 50 (as in FIG. 3a) corresponds to height 38 of shaped character 34.

Figure 3A:
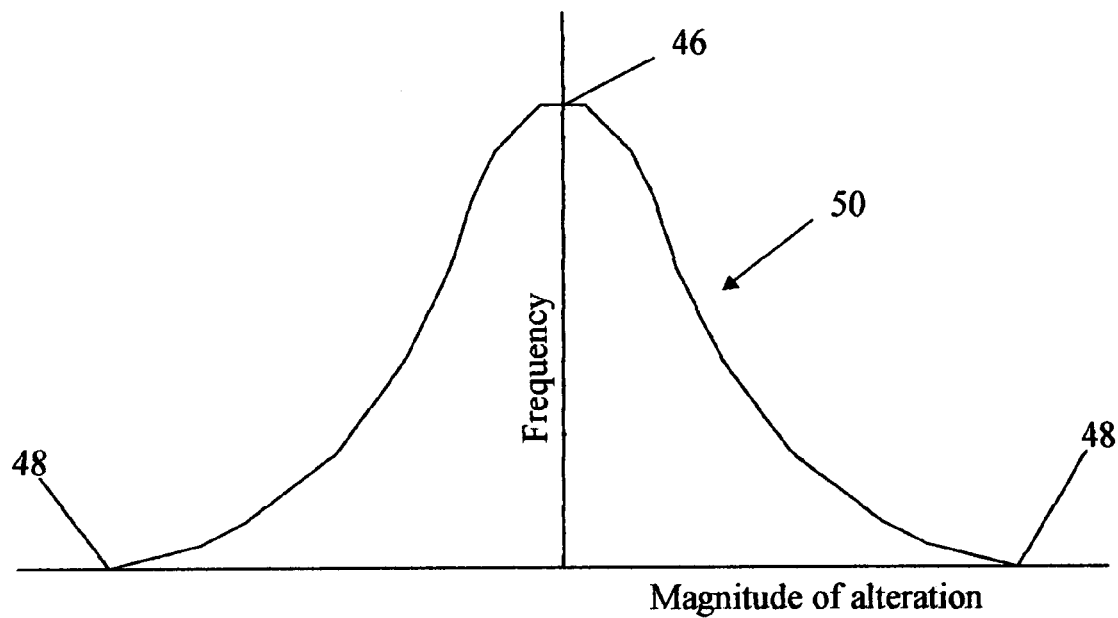
"
FIG. 3*a* shows a bell-shaped frequency distribution.

Frequency distribution 50 in FIG. 3a is bell-shaped and is plotted as a frequency of a magnitude of alteration. The "magnitude of alteration" could be in units of length, angle, percentage change, area, etc. Frequency distribution 50 has a maximum 46 at an approximate minimum alteration (i.e., at around zero), and minima 48 at an approximately maximum alteration, as shown. Of course, in principle, a "normal" distribution does not have well defined minima (because the distribution never reaches zero), in a preferred embodiment frequency distribution 50 does reach zero at a maximum finite alteration. (Although, in the case of radii of curvature or other dimensionable feature types, there may be not problem for a distribution never reaching zero, as an infinite radius of curvature is an easily plotable line.) Frequency distribution 52 shown in FIG. 3b has two maxima 46 surrounding a minimum 47 located at approximately zero alteration, and two minima 48 less than minimum 47 located at an approximate maximum allowable alteration. Of course, there are infinitely many possible frequency distribution shapes, including flat distributions over a finite range, any of which could correspond to a dimensionable feature of a shaped character in first font 18. Further, the frequency distributions need not be continuous, nor do they require a large or infinite number of possible magnitudes of alteration. For example, the application of a frequency distribution corresponding to only a handful (such as ten) different magnitudes of alteration can still produce altered shaped characters that have the appearance of randomness (and thus the appearance of authenticity), particularly where each shaped character has a plurality of elements (discussed later) and/or dimensionable features that may each be altered by one of a handful of randomly selected magnitudes of alteration. Distributions 50, 52 are merely shown for demonstration because of their simplicity.

After CPU 4 has called upon frequency distributions 50, 52 for dimensionable features height 38 and width 36, respectively, random number generator 30 then randomly selects a first number and a second number. The first random number is associated with a point in the area underneath and carved out by the first frequency distribution 50, such that a unique mapping of each random number to a corresponding magnitude of alteration is produced by the frequency distribution 50, in such a manner as to preserve the predetermined desired frequency distribution 50. In other words, if infinitely many numbers were randomly selected and then mapped to a corresponding magnitude of alteration in the manner suggested, and if the frequency of each resulting magnitude of alteration were plotted, frequency distribution 50 would be formed. The production of a magnitude of alteration based on the frequency distribution 50 and the random selection of a number will be readily understood by one of ordinary skill in the art.

Thus, for the first number randomly selected by random number generator 30, the CPU 4 outputs a magnitude of alteration of height 38 based at least in part on the first frequency distribution 50 and the first random number. Assume, for the sake of simplicity, that the resulting magnitude of alteration just happens to be the most likely such magnitude: zero (because frequency distribution 50 has a maximum at approximately zero). Next, for the second number randomly selected by random number generator 30, the CPU 4 outputs a magnitude of alteration of width 36 based at least in part on the second frequency distribution 52 and the second random number. Assume, for the sake of simplicity, that the resulting magnitude of alteration is some positive quantity, such as the magnitude corresponding to the maximum 46 on the right (positive) side of the curve.

Next, the CPU 4 alters the shape of shaped character 34 so that its height is adjusted by zero while its width is adjusted by the above mentioned positive quantity, thus producing altered shaped character 40 having height 44 approximately equal to height 38 of shaped character 34 and having width 42 greater than (by the above mentioned positive quantity) the width 36 of shaped character 34. Thus, the system 2 has randomly altered the shape of shaped character "e" of first font 18. Further, it is not the size of the shaped character "e," per se, that has changed, but rather the width-to-height ratio in changing from width 36/height 38 to width 42/height 44. If the system 2 repeats the process for each of the shaped characters typed or inputted by the user as he types in first document 26, the result is a computer-generated typed document having a dynamic handwriting font such that few or no two corresponding shaped characters appears the same or has the same shape.

Next, the CPU 4 may create an image of the first document 26 having the dynamic handwriting font, such as by creating a .pdf or .jpg file or the like, and storing it in storage medium 6. Alternatively, to reduce the size of first document 26, the CPU 4 may store the document in storage medium 6 as the sum of the shaped characters, where each shaped character includes attribute information about the magnitude of alteration of each of its dimensionable features. The latter alternative may require that the first document 26 is subsequently opened by similar or the same software, because existing softwares (such as MICROSOFT WORD™) will not understand what to do with each shaped character's attributes/dimensions.

Further, in addition to or in place of storing an image of the altered shaped characters in storage medium 6, the CPU 4 may send the image (in the form of first document 26) via network 16 to another computer, or may send an instruction to a printer 14 to print the first document 26. The printer 14 could be any available printer, and is preferably one that will reproduce the first document 26 in a manner that preserves the authentic appearance of its dynamic handwriting font, such as a laser printer or a pen plotter, which may be made to simulate the motion of a person's hand when he hand writes a document. Pen plotters are well known in the art.

Thus, the document printed by printer 14 appears to be a person's handwriting.

"Randomly selecting a number" as used herein does not imply actual or perfect randomness. In fact, it is not clear that it is possible to truly randomly select a number, absent measurements of quantum mechanical interactions. Further, randomness is relative to context. "Randomly selecting a number," as described herein, means selecting a number based at least in part on a criterion upon which the shape of a character does not ordinarily depend—e.g., selecting the number at least in part on some criterion not normally associated with the shape of a character. For example, the same inputs (e.g., typed words) are provided to the computer at different times; yet the shapes of the characters in the two words are different. The random number, itself, may not be random in any actual sense, in that it is predictable with knowledge of the random number generating algorithm. For example, the "random number" could simply be the sum of the current time, so that the number chosen at 12:26:53 pm is just 91. The random number generator need not be any more sophisticated (and could be less so). But the mere fact that the shapes of an otherwise same character are different at 12:26:53 pm (corresponding to "random" number 91, which determines the dimension of one dimensionable feature of one element of the character) and at 12:26:54 pm (just one second later, corresponding to "random" number 92, which determines a possibly different dimension of the same dimensionable feature of the element of the character) give the appearance of randomness, because the selected dimensions of the dimensionable feature are chosen at least in part on some criterion not normally associated with the shape of a character—in this case, the number value of time of day.

Further, the random number could be based on a user input, yet still retain the appearance of randomness. For example, a random number between 0 and 99 could be selected by calculating a base-100 modulus of a sum of the ASCII character values (typically ranging from 0 to 255) of all the preceding characters in the document (i.e., the document in which the characters are being entered by the user) up to the character presently being input. In a metaphysical sense, there is nothing truly random about such a selection. The user could, of course, figure out which number will be "randomly" selected before inputting each subsequent character. What makes this random number generation "random," for all intents and purposes of the present application, is that in actual handwriting, the handwritten shape of a particular character has nothing to do with the base-100 modulus of the sum of the ASCII character values of all the preceding characters in the document. In actual handwriting, the handwritten shape of a particular character has nothing to do with a sum of the hour value, minute value, and second value of the time of day.

Another way to speak of randomness is correlation. For example, a method for generating a number may be said to randomly generate a number relative to a method for selecting a feature in a given context if there is a near-zero correlation (such as between −0.2 to +0.2, preferably between −0.1 to +0.1, preferably between −0.05 to +0.05, and preferably between −0.01 to 0.01) between the two methods. For example, a method for choosing basketball players based on a person's driver's license number may be random for all intents and purposes (because of a suspected near-zero correlation between license number and success at throwing a ball into a hoop), but a method based on a person's height would, of course, not be random (because of a measurably positive correlation). There are, of course, uncountably many ways to randomly select a number according to the present invention, as understood by one of ordinary skill in the art.

Figure 4:
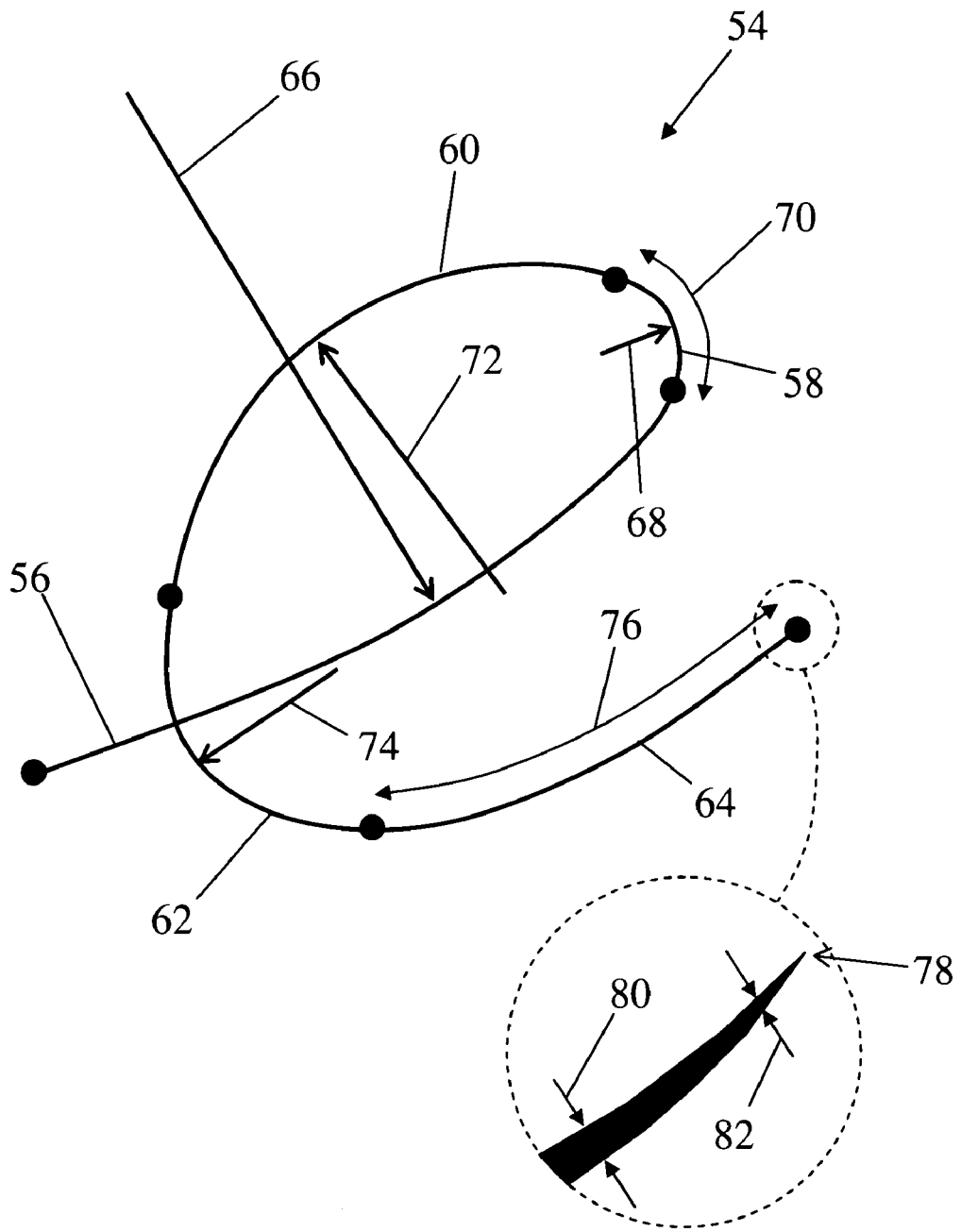
FIG. 4 shows shaped character "e" having a plurality of elements each having at least one dimensionable feature.

Referring now to FIG. 4, another embodiment of the present invention is shown. A shaped character 54 (again representing the character "e" for simplicity of explanation) is parsed into a plurality of elements 56, 58, 60, 62, and 64. Of course, there could be more or fewer such elements than shown. The division between each element is shown as a dot for explanation, although these dots represent points of division, not necessarily actual dots. The CPU 4 may divide each shaped character (such as character 54) into elements based on an algorithm chosen by the software's programmer, or possibly each shaped character in first font 18 may already include attribute information of how to divide each shaped character into component elements. Also, the elements 56, 58, 60, 62, 64 are shown to be non-overlapping, so that any point on the curve of shaped character 54 is a member of exactly one element, but in other embodiments some points may be members of no elements or more than one element.

Each element 56-64 preferably has at least one dimensionable feature. For example, element 56 has a radius of curvature 66, element 58 has a radius of curvature 68 and an arc length 70, element 60 has a radius of curvature 72, element 62 has a radius of curvature 74, and element 64 has an arc length 76. Further, as shown in the exploded portion of FIG. 4, element 64 has a tip 78 having varying line widths 80, 82. This feature represents the "tailing off" of a shaped character when, as a person completes writing the character and lifts her pen off the paper, the line width decreases ultimately to zero. Of course, each element may have several dimensionable features, which may include (but is not limited to) any of a length, a height, a width, a line width, an arc length, a radius of curvature, and an angular orientation. Regarding angular orientation, element 64 could, for example, be angularly rotated as a whole more clockwise or counterclockwise.

Figure 3B:
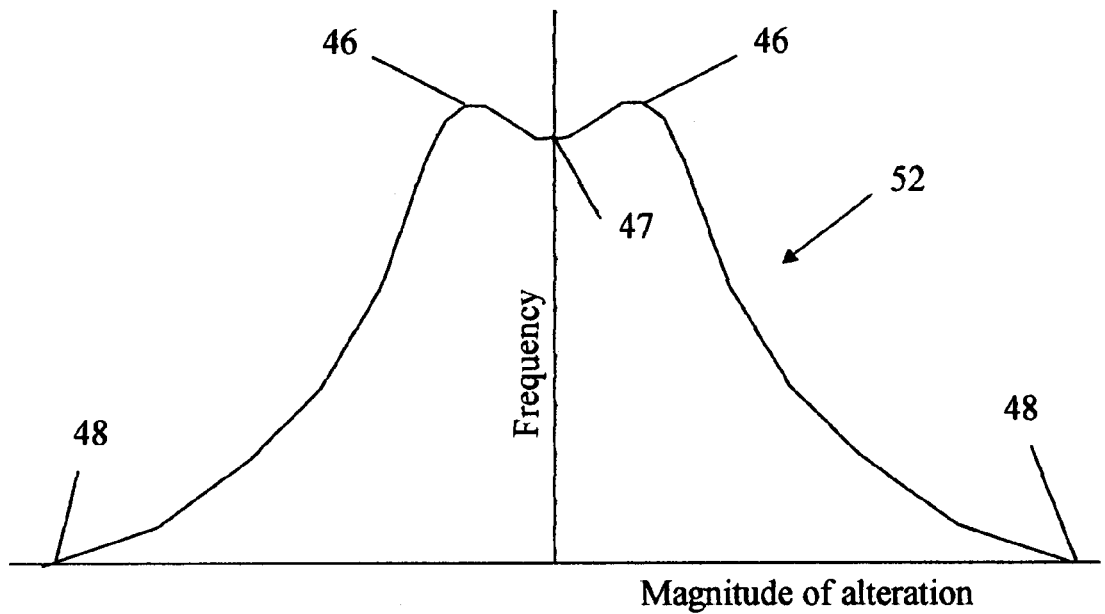
FIG. 3*b* shows a frequency distribution having two maxima.

Each or at least some of dimensionable features 66-76, 80, and 82 may be provided with a unique or individual frequency distribution, such as those shown in FIGS. 3a and 3b. The frequency distributions may be the same or similar (e.g., they may all be bell-shaped, differing only in the units of magnitude of alteration (e.g., angular alteration, length alteration, etc.) or differing only in the narrowness or wideness of the distribution, etc.), or may be completely different. Or, some frequency distributions (such as those provided for all radii of curvature 66, 68, 72) may be the same or similar, while the frequency distributions for other dimensionable features may be very different. Choice of frequency distribution will depend on a clear understanding of the random nature of handwriting. For example, it may be the case that the arc length 76 of "last" element 64 (assuming the shaped character 54 is typically handwritten by starting at element 56) varies far more substantially than the arc length 70 of element 58. If so, the frequency distributions for each of these dimensionable features 70, 76 should reflect this empirical observation to improve the authentic appearance of the dynamic handwriting font created by the present invention.

When CPU 4 attempts to alter the shape of shaped character 54 according to the present invention (after a user has, e.g., input the letter "e" on keyboard 10 while typing in first document 26), a method similar to that described may be used. For example, for each dimensionable feature having a frequency distribution, the random number generator 30 preferably randomly selects a number (although it need not randomly select a number for each dimensionable feature, such as if the same random number is used for some or all dimensionable features). Based on each random number and frequency distribution, CPU 4 outputs a magnitude of alteration (or corresponding dimension). Having output a magnitude of alteration for each (or most) dimensionable feature, CPU 4 alters the shape of shaped character 54 by creating an image of shaped character 54 such that each of its elements 56-64 have their respective dimensionable features 66-76, 80, 82 having the corresponding dimensions as output by CPU 4.

Figure 5A:
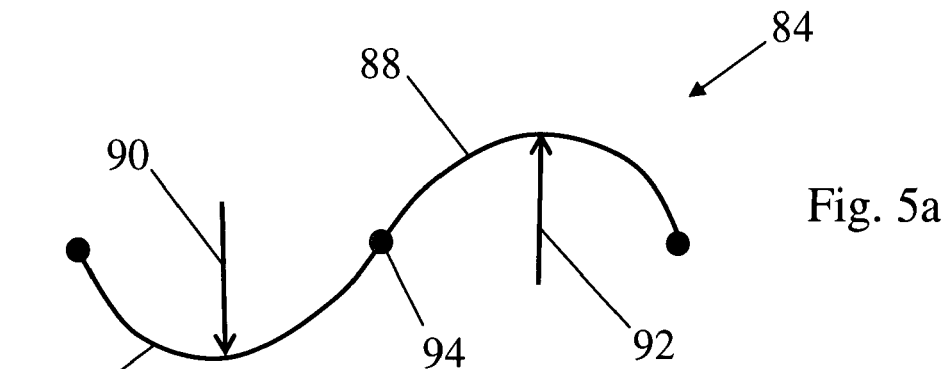
FIGS. 5*a*-5*d* demonstrate a method of smoothing a shaped character according to an embodiment of the present invention.

Because each element 56-64 of the shaped character 54 may be altered randomly relative to each other, the resulting altered shaped character may appear choppy at the division points between the elements. For example, referring now to FIG. 5a, two adjacent elements 86 and 88 in a portion 84 of a shaped character (not shown) are smoothly connected at a division point 94. Element 86 has a radius of curvature 90 and element 88 has a radius of curvature 92. Assume now that the portion 84 is subjected to the random alteration as disclosed herein, so that radius of curvature 90 of element 86 is randomly altered according to a corresponding frequency distribution, and radius of curvature 92 of element 88 is randomly altered according to another (possibly different) corresponding frequency distribution.

Figure 5B:
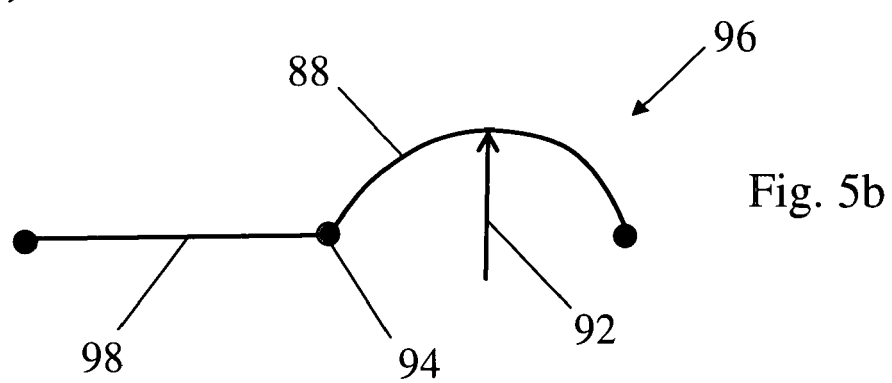

Assume now for purposes of explanation that the magnitude of alteration for radius of curvature 90 is such that it is now extremely large, so that element 86 is altered to appear approximately as a line segment 98, and the magnitude of alteration for radius of curvature 92 is approximately zero so that element 88 is substantially unaltered in portion 96 shown in FIG. 5b. Notice that there is a discontinuity of slope at point 94. To rectify this, the software and/or system 2 according to the present invention are preferably configured to smooth the portion 96 to preserve a continuous curve and/or slope between elements 98 and 88. Continuity, in a mathematical sense, of a function F at point xo may mean $$\forall y \left[ \lim_{x \to x_0^-} \left( \frac{d}{dx} \right)^y F(x) = \lim_{x \to x_0^+} \left( \frac{d}{dx} \right)^y F(x) \right]$$

Figure 5C:
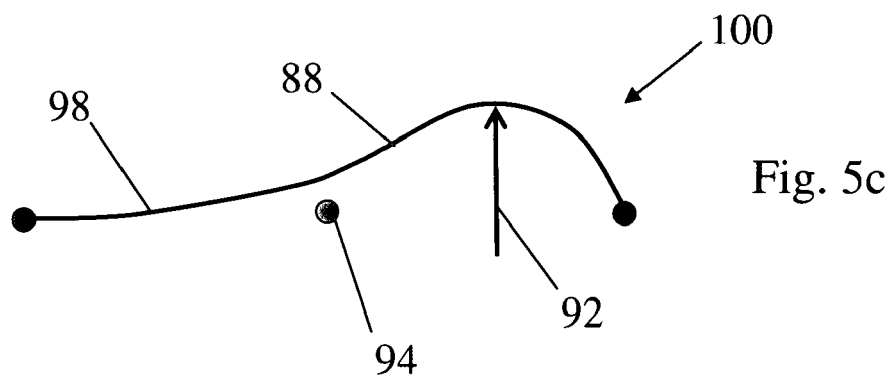
Figure 5D:
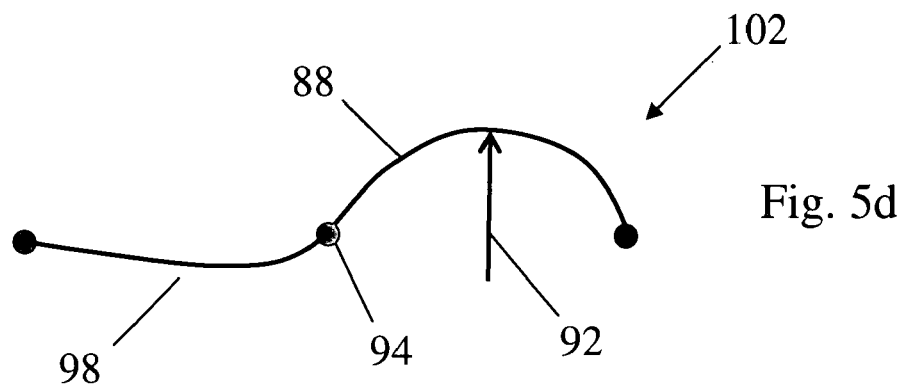

However, such rigidity is not implied by the words "smoothing" or "continuous" in the present application. For example, perhaps substantially equating the positions and first (and possibly second) derivatives of elements 98 and 88 at point 94 may be sufficient to acceptably smooth portion 96 in FIG. 5b. Methods and/or algorithms for performing such a smoothing are relatively straightforward and well known in the art, and further details will not be given. FIG. 5c shows a portion 100 which is an example of smoothing portion 96 without forcing elements 98 and 88 to contact division point 94, and FIG. 5d shows a portion 102 which is an example of smoothing portion 96 while forcing elements 98 and 88 to contact division point 94. Both methods and any other method of smoothing to improve the appearance and authentic appearance of the present dynamic handwriting font are within the scope of the present invention. Further, smoothing need not require altering every element to improve continuity between elements. For example, altering only every other element is possibly while still producing continuity between elements. The examples described herein are not intended to limit the scope of the present invention.

In another embodiment, at least one dimensionable feature of a shaped character in first font 18 has more than one frequency distribution, such as a first and second frequency distribution, which may be chosen by CPU 4 based at least in part on a context of the shaped character. For example, a shaped character "e" (as in FIG. 4) may have a much longer "tail" (or last element 64) if the shaped character appears at the end of a word, compared to if the shaped character appears in the beginning or middle of a word. If so, based on this "context" of the shaped character, the CPU 4 may choose the second frequency distribution for arc length 76 instead of the first frequency distribution if the shaped character appears at the end of a word, where the second frequency distribution has a much higher frequency of long (or high magnitude positive magnitudes of alteration) arc lengths 76 than the first frequency distribution.

Of course, if the dynamic handwriting font is a cursive style (as opposed to a print style in which subsequent letters are not often connected), the system 2 may be configured to connect subsequent letters in a word according to one of several methods currently known.

According to another embodiment of the present invention, while a first handwriting font 18 may be pre-programmed (e.g., it may come as a "standard" font in a software configured to execute the methods described herein), the first handwriting font 18 may also or instead be created based on a person's handwriting. There are several currently available methods for creating a personalized handwriting font based on one's own handwriting, and such methods are within the scope of the present invention. The characters of any of these handwriting fonts may then be randomly altered according to the present invention to create a dynamic handwriting font.

The following will provide a specific embodiment of the invention as it applies to creation of a dynamic handwriting font from a person's own handwriting. A person may first hand write a document and enter this data as digital information into CPU 4, such as by handwriting on a paper and scanning the paper via scanner 8, or by directly inputting his handwriting into the CPU 4 via a touchpad or stylus 10, although other methods may be available and are within the scope of the present invention. Next, the CPU 4 may parse the handwriting into component shaped characters, such as by identifying and parsing the word "the" into "t," "h," and "e." Methods for doing so are well known in the art, and are disclosed in patent publications addressing the creation of a personal handwriting font based on a person's own handwriting. Next, the CPU 4 may group all handwritten instances of the same shaped character, such as by grouping all of the "a" characters in one group, the "b" characters in another group, and so on. Next, for each group, the CPU 4 may measure the dimension of a dimensionable feature of each of the instances in the group. For example, referring again to FIG. 2a, the CPU 4, after receiving and/or reading the word "feel" as input by a user, parses the word into its component shaped characters, "f," "e," and "l." It groups the two "e" characters together, as in FIG. 2b, and measures the dimension of a dimensionable feature for each of the two handwritten instances 34, 40 in the "e" character group. For example, at first it may measure widths 36, 42 of the instances 34, 40, and second it may measure heights 38, 44 of the instances 34, 40. Of course, in a preferred embodiment, a much larger document than merely the word "feel" is read and analyzed by CPU 4, so that each shaped character group preferably contains a large plurality of handwritten instances, such as 5 to 100 or more, so that the measurements of dimensions of a particular dimensionable feature in all the handwritten instances in a shaped character group yields a large number of dimensions. Based on these dimension measurements, the CPU 4 may then form a single shaped character representing (in whatever manner desired by the software's programmer) all of the handwritten instances in that group. For example, in the case of only two handwritten instances 34, 40 shown in FIG. 2b, CPU 4 may measure the dimensions of widths 36 and 42, and then may create a new single shaped character having a width that is, e.g., the average of widths 36 and 42. The same is true for any or all of the other dimensionable features of the group's shaped character. For example, CPU 4 may measure the dimensions of heights 38 and 44, and the new single shaped character may have a height that is their average.

Of course, this method applies also to the more complex embodiment shown in FIG. 4. For example, within each shaped character group (having a plurality of handwritten instances), CPU 4 may break each handwritten instance into a plurality of elements, each element having one or more dimensionable features. The CPU 4 may then proceed to measure the dimensions of each of the dimensionable features of each of the elements of each of the handwritten instances in the group, and may form an "average" or otherwise "representative" shaped character representing the group's shaped character based on these dimensions. Further, these dimensions may be used to form a characteristic frequency distribution for their corresponding dimensionable feature. Thus, the measured dimensions for each dimensionable feature (for each element in each handwritten instance in each shaped character group) may be used not only to create a single representative shaped character for that group (although this is not required), but may also be used to create a frequency distribution for that dimensionable feature of that element of that shaped character. Of course, the combination of each shaped character (and preferably component elements having dimensionable features) with its corresponding frequency distribution(s) for its dimensionable features allows CPU 4 to create a dynamic handwriting font as detailed in the present application.

As an example, assume that a shaped character group comprises 100 handwritten instances of the character "e." The CPU 4 may measure the dimension of the width (e.g., the widths 36, 38 in FIG. 2*b*) of each handwritten instance, and create a frequency distribution based on these measured dimensions. For example, perhaps 5 instances have a width of 1.5 mm, 25 have 2.0 mm, 40 have 2.5 mm, 15 have 3.0 mm, and 15 have 3.5 mm. (Discretization of the distribution, which in this example is 0.5 mm, may be chosen as desired by the software's programmer.) CPU 4 then stores this information in first font 18 in storage medium 6 so that it is called upon pressing of the "e" button by the user on keyboard 10.

As a clarification, a particular shaped character, as described herein, may comprise a definitely shaped character whose shape is randomly modified or altered by the CPU 4. However, a particular shaped character need not have a definite shape. For example, the shaped character "e" could comprise the exact, definite shape of the letter "e" as seen on this page. Alternatively, the shaped character "e" could comprise the concept of the letter "e," which does not itself have a definite form and could exist in thousands of different shapes in thousands of different fonts. Thus, "randomly altering a shape" of the character "e," as used herein, could mean either: a) starting with a particular, definite "e" shape (such as the "e" shape in the Times New Roman font) and randomly changing its shape based on one or more frequency distributions; or b) randomly creating an "e" shape based on the general concept of the letter "e" and one or more frequency distributions. This distinction is what was meant previously by the assertion that creating a handwriting font from a person's handwriting could be performed either by: a) creating a single representative shaped character based on the handwritten instances in the group, and then creating one or more frequency distributions of magnitude of alteration of that single representative shaped character; or b) not creating a single representative shaped character, but creating only one or more frequency distributions of dimension of elements of that shaped character. Thus, the first handwriting font 18, while shown in FIG. 1, may really comprise the frequency distribution set 20, so that there is no single, fixed first handwriting font 18 that is randomly altered by CPU 4.

Once the CPU 4 has created a set 20 of frequency distributions for newly formed handwriting font 18 (based on the user's handwriting), the user may proceed to use CPU 4 to create a document 26 having an authentic appearing dynamic handwriting font, as explained herein.

There are lots of other ways in which handwriting randomly varies so as to appear like handwriting. For example: spacing or pitch between characters in a word, spacing or pitch between words, spacing or pitch between lines, the form of a letter (for example, the script "s" versus the cursive "s"), direction of writing (e.g., handwritten lines, if not ruled by lined paper, may veer upward or downward), the existence of "hooks" or "tails" or "pen trails" on the ends of letters caused by the user failing to completely lift her pen before moving on to the next letter, minor errors (such as dotting an "i" twice or causing a "g" to appear like a "q," etc.), random regions of lighter and darker ink densities due to the use of poor quality ball-point ink pens, etc. Any of all of these features may be included as a dimensionable feature in the handwriting font 18 and may be imposed on the writing in first document 26 according to one or more frequency distributions and numbers randomly selected by random number generator 30, according to the present invention. Any and all of these possibly randomly alterable features are within the scope of the present invention.

I claim:

1. A method for creating a dynamic handwriting font, comprising the following steps:
   providing a handwriting font comprising a plurality of shaped characters, wherein said plurality of shaped characters comprises a first shaped character comprising a plurality of elements, wherein said plurality of elements comprises a first element comprising a plurality of dimensionable features, wherein said plurality of dimensionable features comprises a first dimensionable feature comprising one of: a length, a height, a width, a line width, an arc length, a radius of curvature, and an angular orientation;
   providing a first frequency distribution of dimensions for said first dimensionable feature;
   randomly selecting a number;
   using a processor to choose a dimension for said first dimensionable feature based at least on said first frequency distribution and said randomly selected number; and
   using a processor to create an image of said first shaped character having said first element having said first dimensionable feature having said dimension.

2. A machine-readable storage medium storing executable code and configured to cause a machine to perform the method as claimed in claim 1.

3. A method for creating a dynamic handwriting font, comprising:
   providing a first shaped character;
   providing a predetermined frequency distribution; and
   using a processor to randomly alter a shape of said first shaped character according at least partially to said frequency distribution,
   wherein at least one of a) and b) is true:
   a) the method further comprises providing a handwriting font comprising a plurality of shaped characters, and the plurality of shaped characters comprises the first shaped character; and
   b) the first shaped character comprises at least two elements, a first of the two elements having a first dimensionable feature and a second of the two elements having a second dimensionable feature, and the step of randomly altering comprises randomly altering the first dimensionable feature relative to the second dimensionable feature.

4. The method as in claim 3, further comprising randomly selecting a number, wherein said randomly altering comprises randomly altering said shape of said first shaped character according at least partially to both of said randomly selected number and said frequency distribution.

5. The method as in claim 3, wherein a) is true.

6. The method as in claim 5, wherein said providing a handwriting font comprises: measuring a handwriting written by a person; parsing said handwriting into a plurality of handwritten characters; and creating said handwriting font at least in part from said plurality of handwritten characters.

7. The method as in claim 3, wherein b) is true.

8. The method as in claim 7, further comprising smoothing said first shaped character, whereby at least said first element is altered so that said first element is substantially continuous with said second element.

9. The method as in claim 7, wherein said first and second dimensionable features each comprises one of: a length, a height, a width, a line width, an arc length, a radius of curvature, and an angular orientation.

10. The method as in claim 7, further comprising providing at least one predetermined frequency distribution for each of said first and second dimensionable features, wherein said step of randomly altering comprises randomly altering said first dimensionable feature according at least partially to its predetermined frequency distribution and altering said second dimensionable feature according at least partially to its predetermined frequency distribution.

11. The method as in claim 3, comprising:
providing a handwriting font comprising a plurality of shaped characters, wherein said plurality of shaped characters comprises said first shaped character comprising a plurality of elements, wherein said plurality of elements comprises a first element comprising a plurality of dimensionable features, wherein said plurality of dimensionable features comprises a first dimensionable feature comprising one of: a length, a height, a width, a line width, an arc length, a radius of curvature, and an angular orientation;
providing a first frequency distribution of dimensions for said first dimensionable feature;
randomly selecting a number;
choosing a dimension for said first dimensionable feature based at least on said first frequency distribution and said randomly selected number; and
creating an image of said first shaped character having said first element having said first dimensionable feature having said dimension.

12. The method as in claim 11, wherein each of said plurality of shaped characters comprises a plurality of elements, wherein each of said plurality of elements comprises a plurality of dimensionable features, wherein each of said plurality of dimensionable features comprises one of: a length, a height, a width, a line width, an arc length, a radius of curvature, and an angular orientation, and wherein said method further comprises:
providing a frequency distribution of dimensions for each of said plurality of dimensionable features of said plurality of elements of said plurality of shaped characters;
receiving an instruction to create an image of a first shaped character of said plurality of shaped characters;
randomly selecting a first number,
choosing a first dimension for a first dimensionable feature of a first element of said first shaped character based at least on said randomly selected first number and a first frequency distribution provided for said first dimensionable feature; and
creating an image of said first shaped character having said first element having said first dimensionable feature having said first dimension.

13. The method as in claim 12, further comprising:
randomly selecting a number for each dimensionable feature for each element of said first shaped character,
choosing a dimension for each said dimensionable feature of each said element of said first shaped character based at least on said randomly selected number for said each said dimensionable feature and said frequency distribution provided for said each said dimensionable feature; and
creating an image of said first shaped character having each said dimensionable feature having said dimension for said each said dimensionable feature.

14. The method as in claim 11, further comprising:
providing a second frequency distribution of dimensions, different from said first frequency distribution, for said first dimensionable feature; and choosing between said first and second frequency distributions based at least in part on a context of said first shaped character.

15. The method as in claim 11, wherein said creating said image comprises smoothing said first shaped character, whereby at least one of said plurality of elements is altered so that said at least one of said plurality of elements is substantially continuous with an adjacent element.

16. A machine-readable storage medium storing executable code and configured to cause a machine to perform the method as claimed in claim 3.

17. A method for creating a dynamic handwriting font, comprising:
measuring a dimension of a first dimensionable feature of each of a plurality of handwritten instances of a first shaped character, so as to create a plurality of dimensions corresponding to said first dimensionable feature of said plurality of handwritten instances of said first shaped character;
creating a first frequency distribution for said first dimensionable feature of said first shaped character based at least in part on said plurality of dimensions, and
using a processor to randomly alter a shape of said first shaped character according at least partially to said first frequency distribution,
wherein said measuring comprises:
reading an input of a handwriting written by a person;
parsing said handwriting into a plurality of shaped characters comprising said first shaped character;
for each shaped character, grouping handwritten instances of said each shaped character;
parsing said first shaped character into a plurality of elements comprising a first element, said first element having said first dimensionable feature; and
measuring said a dimension of said first dimensionable feature of each of said grouped handwritten instances of said first shaped character.

18. The method as in claim 17, wherein said plurality of elements comprises a second element having a second dimensionable feature, and wherein the method further comprises:
measuring a dimension of said second dimensionable feature of each of said grouped handwritten instances of said first shaped character;
creating a second frequency distribution for said second dimensionable feature of said first shaped character based at least in part on said plurality of dimensions;

selecting said first shaped character based at least in part on an input by a user, and randomly altering said first dimensionable feature of said first shaped character based at least in part on said first frequency distribution, and randomly altering said second dimensionable feature of said first shaped character based at least in part on said second frequency distribution, wherein said first dimensionable feature is altered relative to said second dimensionable feature.

19. A machine-readable storage medium storing executable code and configured to cause a machine to perform the method as claimed in claim 17.

* * * * *